March 1, 1966   T. R. ANGUS   3,237,267
CLAMP
Filed July 12, 1963
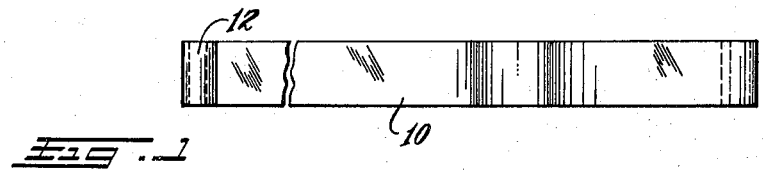
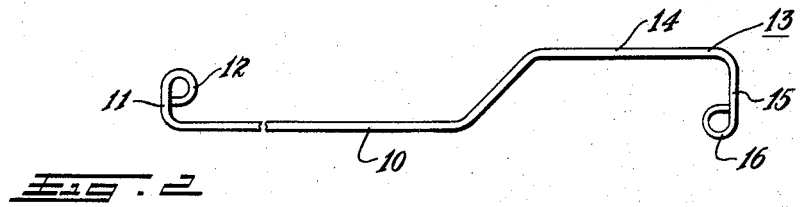
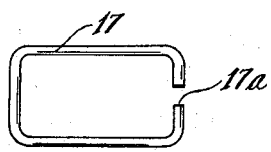
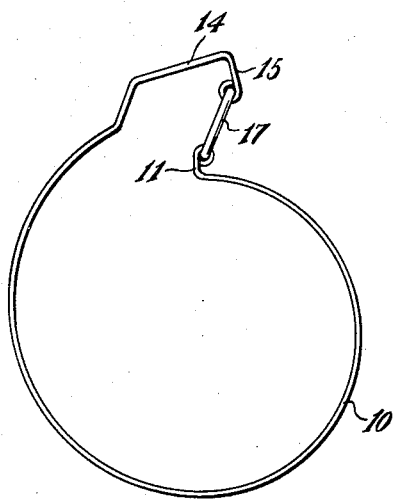
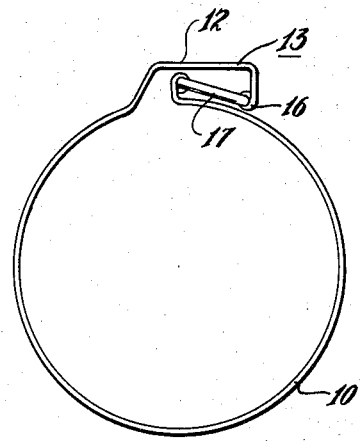
INVENTOR.
THOMAS R. ANGUS
BY
Oberlin, Maky & Donnelly
ATTORNEYS 3,237,267
CLAMP
Thomas R. Angus, Willoughby, Ohio, assignor, by mesne assignments, to The Eagle-Picher Company, Cincinnati, Ohio, a corporation of Ohio
Filed July 12, 1963, Ser. No. 294,630
1 Claim. (Cl. 24—270)

The present invention relates to a clamp and, more particularly, to a toggle clamp of simple two piece construction.

Clamps find very frequent application in everyday use. One common application is an attaching hose to a telescoping support. For example, an automotive defroster hose is commonly installed over heater or duct tubes and the hose then clamped tightly around the mating tube.

The principal object of the present invention is to provide an improved clamp for the general purposes indicated and especially a clamp operating on the toggle principle.

Another object is to provide a clamp of a simple two piece construction which yet appreciably resists forces tending to open it.

A further object is to provide a toggle clamp having formed as a part thereof a housing to protect the toggle mechanism when the clamp is in a closed position.

Other objects will become apparent as the description proceeds.

To the accomplishment of the foregoing and related ends, the invention consists of the features hereinafter fully described and particularly pointed out in the claim, the annexed drawing and following disclosure describing in detail the invention, such drawing and disclosure illustrating, however, but one or more of the various ways in which the invention may be practiced.

In the accompanying drawing:

FIGURES 1 and 2 are plan and side views, respectively, of an elastic band or strip of the present clamp;

FIGURE 3 is a plan view of a clip or link which together with the band of FIGURES 1 and 2 constitutes all the parts of the clamp; and FIGURES 4 and 5 show the parts assembled to form the clamp, the latter being illustrated, respectively, in opened and closed positions.

As indicated the present clamp includes only two parts: a band or strip of elastic material and a link or clip means joining the two ends of the band preferably in a toggle type of action. One end of the strip or strap is offset so as to provide in a closed position of the clamp a protective covering or housing for the ends of the strip and intermediate toggle mechanism.

Referring to the drawing, the embodiment illustrated includes a band or strip 10 which can be shaped into a generally annular configuration as shown in FIGURES 4 and 5. The band is made from an elastic material, usually metal such as spring steel. The inwardly overlapped end or terminal of the band 10 (as viewed, for example, in FIGURES 4 and 5) has a substantially outwardly radially disposed bend 11, the extremity of which is folded back on itself to form a closed loop or eyelet 12. The outwardly overlapping end or terminal of the band 10 has a radially outwardly offset or upset portion generally shown at 13 ending in two angularly related sides or legs 14 and 15, shown in the embodiment of the drawing to be perpendicularly related. The side or leg 15 also has at its extremity a closed loop or eyelet 16 which is directed rearwardly, that is, back toward the leg 14 and band 10.

A U-shaped wire 17 serves as a clip or link means to join the terminals of the band 10. The wire 17, which has a slight opening 17a to permit assembly, engages the closed loops 12 and 16 and freely pivots therein.

The opening and closing of the clamp preferably operates on the toggle principle. In such an action, the link 17 passes over center with respect to a line perpendicular to the side or leg 14. In closing the clamp, the wire link or clip 17 swings the outwardly overlapping terminal of the band past and over the inwardly overlapped terminal to the position of FIGURE 5. In this closed position, the sides 14 and 15 of the offset portion define a housing which covers the ends of the band 10, both loops 12 and 16, and the interconnecting link 17 as well. Not only does the clamp strongly resist forces tending to open it in spite of the very simple construction of the clamp, but the defined housing protects the closed clamp against accidental opening as, for instance, from inadvertent blows and the like during use. Also, this structure provides an easy means for opening the clamp when desired, as by inserting a finger or tool beneath the upset portion 13 of the strip or at the intersection of the sides 14 and 15, and then pulling.

It will now be apparent that the present invention provides an improved toggle type of clamp of simple two piece construction. The clamp appreciably resists forces tending to open it in spite of its relatively simple construction and further forms as an integral part thereof a housing which protects the ends of the band and the interconnecting toggle mechanism when the clamp is in a closed position.

Other forms embodying the features of the invention may be employed, change being made as regards the features herein disclosed, provided those stated by the following claim or the equivalent of such features be employed.

I claim:

A toggle clamp comprising an elongated strip of elastic material fashioned in a generally annular shape and having its ends formed into closed loops, one end being outwardly upset from an arcuate portion of the band and having two legs generally disposed perpendicular to each other and defining, respectively, an outside leg adapted to overlie the other end of the band and a terminal leg extending inwardly toward an arcuate portion of the band, said terminal leg containing one of said closed loops, and means freely passing through each loop to open and close the clamp by passing over center with respect to a line perpendicular to said outside leg, said upset end defining an open sided housing which covers said loops and interconnecting means to protect said parts when in a closed position and provides finger engageable edge portions along said legs and spaced from said interconnecting means to facilitate release of the clamp.

References Cited by the Examiner

UNITED STATES PATENTS

| 1,012,345 | 12/1911 | Ferguson | 24—270 |
| 2,389,741 | 11/1945 | Reichart | 24—270 X |
| 2,665,094 | 1/1954 | Christophersen | 24—19 X |
| 2,768,418 | 10/1956 | Hoy et al. | 24—270 |

FOREIGN PATENTS

| 640,031 | 3/1928 | France. |
| 838,035 | 5/1952 | Germany. |

WILLIAM FELDMAN, *Primary Examiner.*

DONLEY J. STOCKING, *Examiner.*